United States Patent
Thanneeru et al.

(10) Patent No.: US 10,868,763 B2
(45) Date of Patent: Dec. 15, 2020

(54) POLICY BASED DUAL CONNECTIVITY TRAFFIC STEERING

(71) Applicant: T-Mobile USA, Inc., Bellevue, WA (US)

(72) Inventors: Suresh Thanneeru, Redmond, WA (US); Salvador Mendoza, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 150 days.

(21) Appl. No.: 16/134,731

(22) Filed: Sep. 18, 2018

(65) Prior Publication Data
US 2020/0092210 A1    Mar. 19, 2020

(51) Int. Cl.
| | |
|---|---|
| *H04L 12/801* | (2013.01) |
| *H04W 28/08* | (2009.01) |
| *H04W 28/02* | (2009.01) |
| *H04L 12/803* | (2013.01) |
| *H04W 88/06* | (2009.01) |
| *H04W 36/00* | (2009.01) |

(Continued)

(52) U.S. Cl.
CPC ............ *H04L 47/15* (2013.01); *H04L 47/125* (2013.01); *H04L 47/14* (2013.01); *H04W 8/18* (2013.01); *H04W 28/0236* (2013.01); *H04W 28/085* (2013.01); *H04W 36/0069* (2018.08); *H04W 76/15* (2018.02); *H04W 88/06* (2013.01)

(58) Field of Classification Search
None
See application file for complete search history.

(56) References Cited

U.S. PATENT DOCUMENTS

| | | | |
|---|---|---|---|
| 2011/0202485 A1 | 8/2011 | Cutler et al. | |
| 2015/0319618 A1* | 11/2015 | Zhang | H04W 12/06 370/329 |
| 2016/0337903 A1 | 11/2016 | Cheng et al. | |

(Continued)

FOREIGN PATENT DOCUMENTS

WO    WO2016019999 A1    2/2016

OTHER PUBLICATIONS

The PCT Search Report and Written Opinion dated Dec. 19, 2019 for PCT Application No. PCT/US2019/048839, 9 pages.

*Primary Examiner* — Chi H Pham
*Assistant Examiner* — Raul Rivas
(74) *Attorney, Agent, or Firm* — Lee & Hayes, P.C.

(57) ABSTRACT

Policy based dual connectivity traffic steering is described herein. A master Long-Term Evolution (LTE) base station may operate in conjunction with a secondary New Radio (NR) base station to provide dual connectivity to user equipment (UE) operating in an environment. The LTE base station can steer traffic between the LTE base station and the NR base station based at least in part on policy information received at the LTE base station. The policy information can indicate, for a particular UE and for a particular Quality of Service (QoS) Class Identifier (QCI), whether the LTE base station can transfer a communication to the NR base station. Thus, traffic steering determinations can be based on the policy information, quality identifiers, device capability, signal strength(s), load level(s), and the like, thereby providing a flexible framework for steering wireless traffic in a dual connectivity environment.

20 Claims, 5 Drawing Sheets

(51) Int. Cl.
*H04W 8/18* (2009.01)
*H04W 76/15* (2018.01)

(56) References Cited

U.S. PATENT DOCUMENTS

2017/0064691 A1  3/2017  Kubota et al.
2018/0092085 A1  3/2018  Shaheen et al.
2018/0359672 A1* 12/2018  Keller .................. H04L 67/141

* cited by examiner

POLICY BASED DUAL CONNECTIVITY TRAFFIC STEERING

BACKGROUND

Cellular communication devices use network radio access technologies to communicate wirelessly with geographically distributed cellular base stations. Long-Term Evolution (LTE) is an example of a widely implemented radio access technology that is used in 4th Generation (4G) communication systems. New Radio (NR) is a newer radio access technology that is used in 5th Generation (5G) communication systems. Standards for LTE and NR radio access technologies have been developed by the 3rd Generation Partnership Project (3GPP) for use by wireless communication carriers.

A communication protocol defined by the 3GPP, referred to as EN-DC (E-UTRAN/New Radio-Dual Connectivity) enables the simultaneous use of LTE and NR radio access technologies for communications between a mobile device and a cellular communication network. EN-DC may also be referred to as LTE/NR dual connectivity. EN-DC is described by 3GPP Technical Specification (TS) 37.340.

EN-DC can be implemented in conjunction with a 4G core network, with the support of 5G base stations, in a configuration known as Non-Standalone Architecture (NSA). In this configuration, a 4G LTE base station (referred to as a Master eNodeB or MeNB) is associated with a 5G NR base station (referred to as a Secondary gNodeB or SgNB). In an NSA system, both the LTE base station and the NR base station support a 4G core network. However, control communications are between the 4G core network and the LTE base station, and the LTE base station is configured to communicate with and to control the NR base station.

In an NSA system, a mobile device initially connects to an LTE base station. When in a connected state, the LTE base station instructs the device to determine whether a communication session associated with the mobile device is associated with a particular Quality of Service (QoS) Class Identifier (QCI). For example, some implementations simply restrict the mobile device from connecting to the NR based on the QCI being limited to a particular range (e.g., 1-5). Such an implementation reduces flexibility and may result in suboptimal network performance or poor user experiences.

There are several proposed configurations for NSA dual connectivity, and communications between the components may be implemented in various ways in other configurations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
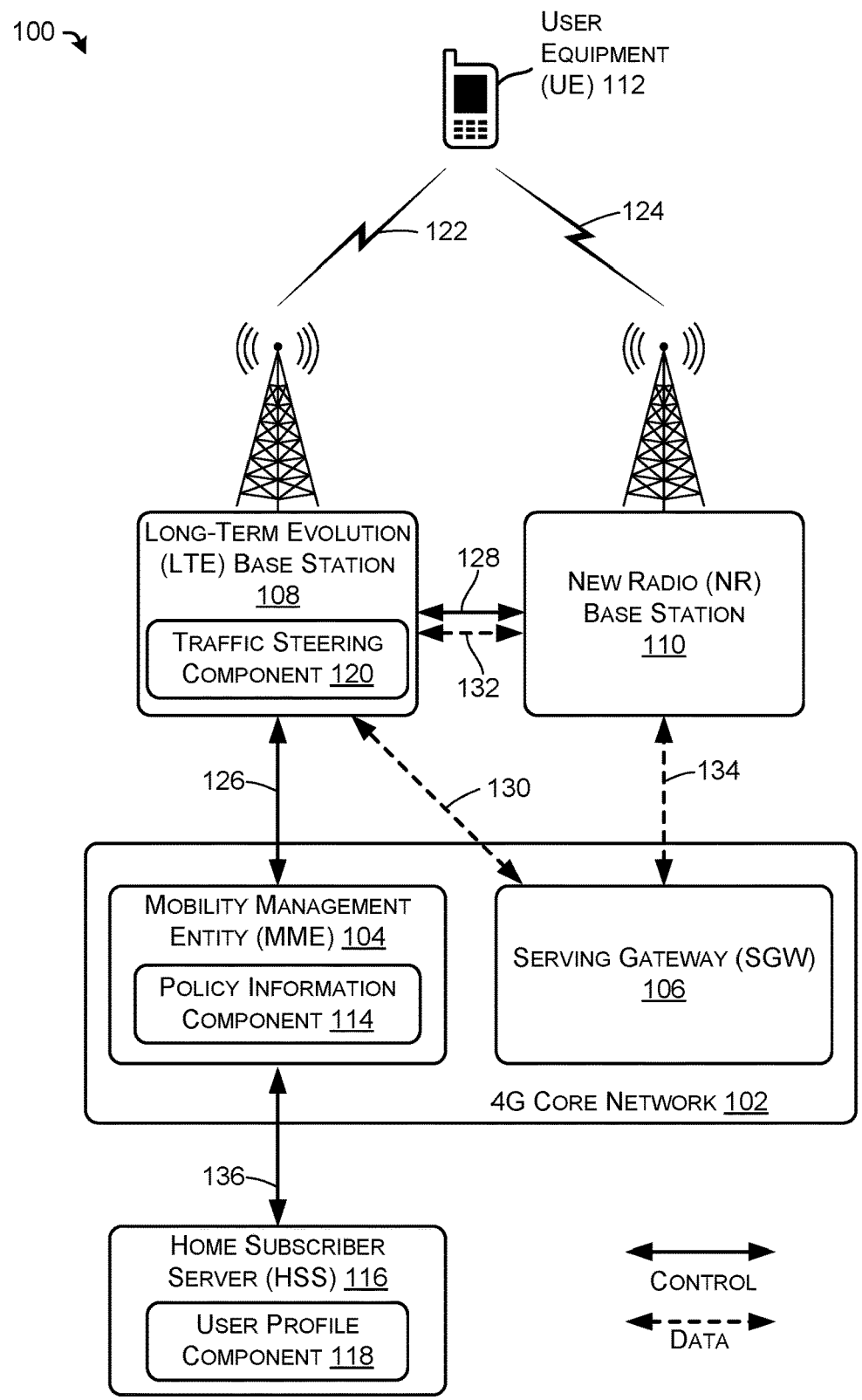
FIG. 1 illustrates an example environment including user equipment and various components implementing dual connectivity traffic steering, as described herein.

The systems, devices, and techniques described herein are directed to policy based dual connectivity traffic steering. In some instances, a master base station (e.g., a Long-Term Evolution (LTE) base station) may operate in conjunction with a secondary base station (e.g., a New Radio (NR) base station) to provide dual connectivity to user equipment (UE) operating in an environment. The LTE base station can steer traffic between the LTE base station and the NR base station based at least in part on policy information received at the LTE base station and based at least in part on subscriber information associated with the UE. In some instances, the policy information can be represented as a flag (e.g., one or more bits) indicating whether the LTE base station can transfer a communication (e.g., associated with a particular Quality of Service (QoS) Class Identifier (QCI)) to the NR base station. Thus, traffic steering determinations can be based on the policy information, quality identifiers (e.g., Quality of Service (QoS) Class Identifier (QCI)), device capability, signal strength(s), load level(s), and the like, thereby providing a flexible framework for steering wireless traffic in a dual connectivity environment.

In such an environment, a UE can initially connect to the LTE base station and can transmit a request to initiate a communication. Based at least in part on the request, the LTE base station can access a 4th Generation (4G) core network to request policy information associated with the UE. In some examples, the request for policy information can be received by a mobility management entity (MME), which in turn may access a home subscriber server (HSS) to access user profile information associated with the UE. For example, the request for policy information may include an international mobile subscriber identifier (IMSI) associated with the UE, which can be used to identify and access the user profile associated with the UE stored in the HSS. In some instances, the user profile information can include a subscriber level (e.g., with various subscriber tiers associated with good, better, best, etc.), a maximum or minimum bandwidth, and the like. The policy information indicative of whether communications can be transferred to a NR base station can be based on the subscriber level or other factors.

By way of example, a first UE initially connected to a LTE base station may request to initiate a first communication having a QCI of 6, which may correspond to a data communication (e.g., a non-guaranteed bit rate communication). The LTE base station can receive first policy information associated with the first UE to determine whether the first communication can be transferred to a NR base station, which may provide a higher bandwidth and/or a lower latency compared to the LTE base station. Based at least in part on the first policy information indicating that the first communication can be transferred to the NR base station, the LTE base station can instruct the NR base station to provide a communication channel to the first UE to facilitate the first communication.

Similarly, a second UE initially connected to the LTE base station may request to initiate a second communication having a same QCI as the first communication (e.g., in this case, a QCI of 6). The LTE base station can receive second policy information associated with the second UE, which may indicate that the second communication may not be transferred to the NR base station. Thus, the LTE base station may establish a bearer at the LTE base station to facilitate the second communication, without transferring the second communication to the NR base station. Accordingly, a bearer for communications associated with a same QCI can be set up based at least in part on the policy information, which may be specific to individual UEs.

As introduced above, a master base station (e.g., the LTE base station) can steer traffic in a dual connectivity environment based on the policy information, as well as other factors. For example, the LTE base station can steer traffic based on one or more of: a LTE signal strength received at a UE; a NR signal strength received at the UE; a strength of a signal received at the LTE base station or the NR base station; traffic levels at the LTE base station and/or the NR base station; delay; jitter; packet loss; bandwidth; and the like. Accordingly, incorporating policy information into a traffic steering determination can provide a flexible framework for optimizing traffic and/or individual user experiences in a network.

In some examples, the policy information for a particular UE can be based at least in part on a QCI associated with a communication. For example, for a first UE, communications associated with QCIs of 1-7 may be transferred to a NR base station, while for a second UE, communications associated with QCIs of 1-5 may be transferred to the NR base station. For a third UE, communications associated with QCIs 7-9 may be transferred to the NR base station, while communications associated with QCIs 1-6 may be restricted from being transferred to the NR base station. Thus, the policy information can be a function of the QCI associated with a particular communication, as well as subscriber information associated with a particular UE. As can be understood, the specific QCIs to be allowed to transfer to the NR base station are examples and are not intended to be limiting. Further, policy information for each QCI for each UE can be dynamically updated at any time, and is not limited to a static setting.

In some instances, guaranteed bearer type QCIs may include, but are not limited to {1, 2, 3, 4, 65, 66}, and in some instances, non-guaranteed bit rate (non-GBR) bearer types may include but are not limited to {5, 6, 7, 8, 9, 69, 70}. As can be understood, this traffic steering framework can be implemented on any number of individual QCI levels.

The systems, devices, and techniques described herein can improve a functioning of a network by providing a framework to control traffic steering in a dual connectivity environment. For example, policy information can be based on the QCI associated with a communication as well as the user profile associated with a UE. Further, processing can be reduced at a LTE base station (or a master base station, in a master/secondary relationship) by checking policy information to determine if transferring between base stations in a dual connectivity is allowed prior to determining whether network conditions (e.g., signal strength, load, etc.) would support establishing a bearer at a particular base station. Additionally, accessing such policy information by a base station (rather than having such policy information hardcoded into each base statin) allows policy information to be updated dynamically for a particular user and/or based on changes to network topology. In some instances, policy information can be used to ensure that a particular user experience is provided for particular subscriber levels. These and other improvements to the functioning of a computer and network are discussed herein.

The systems, devices, and techniques described herein can be implemented in a number of ways. In general, the techniques discussed herein may be implemented in any dual connectivity or multi connectivity environment, and are not limited to 2G, 3G, 4G, and/or 5G environments. Example implementations are provided below with reference to the following figures.

FIG. 1 illustrates an example network 100 including user equipment and various components implementing the dual connectivity traffic steering, as described herein. The components shown in FIG. 1 may be used to implement dual connectivity, for use in a Non-Standalone Architecture (NSA) configuration. When using NSA, a communication device may use both an LTE carrier and an NR carrier for uplink and downlink transmissions to and from respective LTE and NR base stations, based on the policy information, as discussed herein. The LTE carrier can be used for control-plane messaging and for user-plane communications. The NR carrier can be used for additional user-plane bandwidth.

For purposes of discussion, a 4G or LTE component is a component that performs according to 4G or LTE communications standards. A 4G or LTE signal or communication is a signal or communication that accords with 4G or LTE communications standards. A 5G or NR component is a component that performs according to 5G or NR communications standards. A 5G or NR signal or communication is a signal or communication that accords with 5G or NR communications standards. Although often discussed in the context of 4G and 5G environments, the techniques discussed herein may be implemented in any dual connectivity or multi connectivity environment.

The network 100 includes a 4G core network 102. Components of the 4G core network 102 that are relevant to this discussion include a Mobility Management Entity (MME) 104 and a Serving Gateway (SGW) 106. The MME 104 and the SGW 106 may be implemented in accordance with 3GPP 4G specifications. FIG. 1 also shows a 4G LTE base station 108, a 5G NR base station 110, and user equipment (UE) 112. The UE 112 may be referred to in the following discussion as a cellular communication device 112 or as a device 112, however it should be understood that UE 112 may be any form of appropriate device, including but not limited to, smart phones, mobile phones, cell phones, tablet computers, personal digital assistants (PDAs), laptop computers, electronic book devices, smart watches, or any other portable electronic devices that can generate, request, receive, transmit, or exchange voice, video, and/or digital data over a network. Additional examples of the user equipment 112 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

Further, the MME 104 can include a policy information component 114. The MME 104 and/or the 4G core network 102 can be communicatively coupled with a home subscriber server (HSS) 116, which can include a user profile component 118. The LTE base station 108 can include a traffic steering component 120 to steer traffic between the LTE base station 108 and the NR base station 110 based on policy information, and other factors, as discussed herein.

Control plane communication channels between the base stations the components of the 4G core network (and additional components) are shown as solid lines. Data plane communication channels between the base stations and the components of the 4G core network are shown as dashed lines. Wired or wireless communications between the cellular communication device and the base stations are shown as lightning bolt symbols. Further, control plane and/or data plane communications may be transmitted and/or received via any wired or wireless transmission paths.

The LTE base station 108 and the NR base station 110 may in some cases be associated with each other by being co-located at a single cell site. Although only a single pair of base stations is shown in FIG. 1, the network 100 may include multiple cell sites, some of which might have both an LTE base station and an NR base station. In some instances, at least a portion of a geographic coverage area associated with the LTE base station 108 can overlap with a geographic coverage area associated with the NR base station 110.

The MME 104 functions as a control node for the 4G core network 102. For example, the MME 104 may facilitate idle mode, bearer activation and deactivation, serving gateway (SWG) selection, user authentication, and the like. In practice, a 4G core network may have multiple MMEs. As introduced above, the MME 104 can include the policy information component 114, which can receive a registration request and/or a request to initiate a communication from the UE 112 and may access the HSS 116 to determine subscriber level information stored in the user profile component 118.

The SGW 106 functions as a communication gateway of the 4G core network 102. The SGW 106 is a data plane interface with the LTE and NR base stations 108 and 110, respectively. A 4G core network may have multiple SGWs.

The HSS 116 functions as a remote computing device that includes user profile information, represented as the user profile component 118. In some cases, the HSS 116 may facilitate user authentication and access authorization. The HSS 116 can provide user profile information to the MME 104 (and subsequently to the LTE base station 108) in response to a registration request and/or a request to initiate a communication.

The LTE base station 108 is configured in accordance with 4G LTE standards to communicate with devices using the LTE radio access technology. The NR base station 110 is configured in accordance with 5G NR standards to communicate with devices using NR radio access technology. An LTE base station is often referred to as an eNodeB. An NR base station is often referred to as a gNodeB. In some instances, the LTE base station 108 is not limited to LTE technology, and may be referred to generally as a first base station 108. In some instances, the NR base station 110 is not limited to NR technology, and may be referred to generally as a second base station 110.

The UE 112 may be one of many such devices that are configured for use within the network 100. The UE 112 may comprise any of various types of cellular communication devices that are capable of wireless data and/or voice communications, including smart phones and other mobile devices, "Internet-of-Things" (IoT) devices, smart home devices, computers, wearable devices, entertainment devices, industrial control equipment, etc. In certain environments, the UE 112 may be referred to as a computing device, a cellular communications device, or a mobile station (MS).

During a data communication session, the UE 112 can establish a primary LTE data connection 122 with the LTE base station 108 and a secondary NR data connection 124 with the NR base station 110. The primary LTE data connection 122 is a wireless communication channel that uses LTE radio access technology. The secondary NR data connection 124 is a wireless communication channel that uses NR radio access technology.

The network 100 can use a first control-plane communication channel 126 between the MME 104 and the LTE base station 108, and a second control-plane communication channel 128 between the LTE base station 108 and the NR base station 110. The network 100 can use a first data-plane communication channel 130 between the SGW 106 and the LTE base station 108, and a second data-plane communication channel 132 between the LTE base station 108 and the NR base station 110. Some implementations may also have a data-plane communication channel 134 between the SGW 106 and the NR base station 110. In some examples, the network 100 can use a data-plane communication channel 136 between the MME 104 (or the 4G Core Network 102, generally) and the HSS 116.

An example use case for traffic steering in the dual connectivity network 100 is discussed. The UE 112 can connect to the LTE base station 108 and the UE 112 can provide a registration request or a request to initiate a communication to the LTE base station 108. In some instances, the request may include an international mobile subscriber identity (IMSI) and/or a request for a bearer for a communication. In some instances, the LTE base station 108 can send a request for policy information to the MME 104, which in turn can access the user profile component 118 of the HSS 116 to determine a subscriber level of the UE 112. In some instances, based at least in part on the subscriber level, the MME 104 can select, map, or otherwise determine policy information associated with the subscriber level. By way of example, and without limitation, the policy information component 114 may determine, for a particular UE, a first subset of QCI levels for which a communication may be transferred to the NR base station and a second subset of QCI levels for which a communication may not be transferred to the NR base station.

Upon receipt of the policy information, the traffic steering component 120 of the LTE base station 108 can instruct the NR base station 110 to initiate a communication with the UE 112, or the LTE base station 108 can initiate a communication between the LTE base station 108 and the UE 112.

In some examples, the traffic steering component 120 can utilize the LTE base station 108 and the NR base station 110 simultaneously for a single communication or for multiple communications with the UE 112. For example, in some instances, uplink data or downlink data can be assigned independently to the LTE base station 108 or the NR base station 110. Further, in some examples, a first communication (e.g., a voice session) of the UE 112 can be handled by the LTE base station 108, while a second communication (e.g., a data session) can be handled by the NR base station 110. Of course, the examples are illustrative and are not intended to be limiting.

Although the UE 112 is described as communicating through a single cell site using both LTE and NR communications, it may be that in certain situations the LTE communications are through an LTE base station of a first cell site and the NR communications are through an NR base station of another cell site.

As may be understood, the network 100 may be implemented in accordance with any one of Option 3, 3a, 3x, 4, 4a, 7, 7a, and/or 7x, as defined by 3GPP. That is, the network 100 may include a 5G core and/or may include additional data-plane or control-plane signaling. In general, the techniques discussed herein may be implemented in any dual connectivity or multi connectivity environment.

Figure 2:
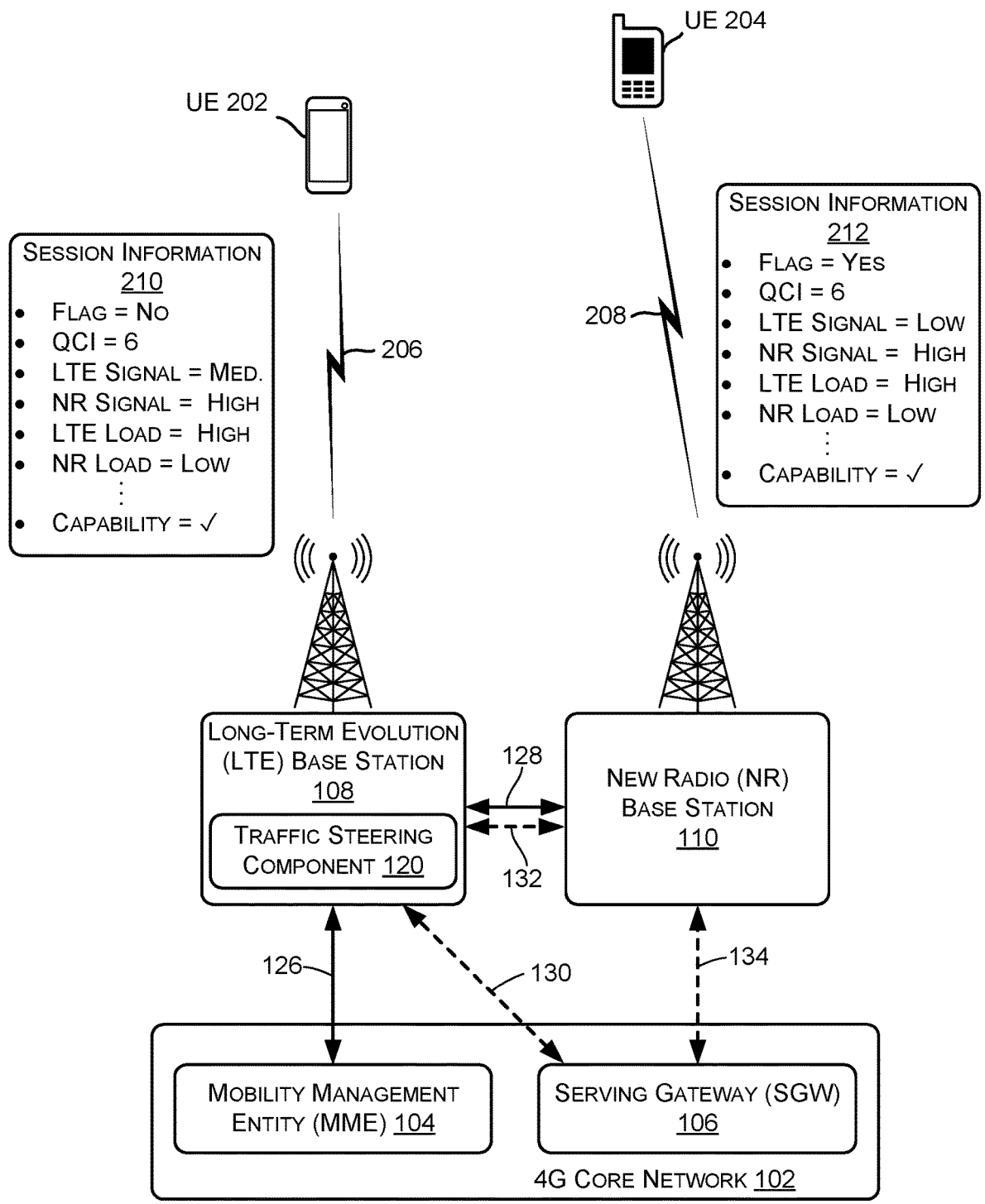
FIG. 2 illustrates an environment including a first user equipment and a second user equipment communicating in a dual connectivity network, based on policy information and other factors, as described herein.

FIG. 2 illustrates an environment 200 including a first user equipment 202 and a second user equipment 204 communicating in a dual connectivity network, based on policy information and other factors, as described herein.

In some instances, the first user equipment (UE) 202 can be assigned a bearer to communicate via the LTE base station 108. For example, a communication 206 represents the bearer between the UE 202 and the LTE base station 108.

In some instances, the second UE 204 can be assigned a bearer to communicate via the NR base station 110. For example, a communication 208 represents the bearer between the UE 204 and the NR base station 110.

As illustrated, the communication 206 is associated with session information 210 and the communication 208 is associated with session information 212. By way of example, and without limitation, the session information 210 can include a flag (e.g., indicating whether the communication 206 can be transferred to the NR base station, which in this case, is set as "No"), a QCI (in this case, determined to be 6), a measurement of the LTE signal strength (e.g., a downlink signal strength such as a received signal strength indication (RSSI), reference signal received power (RSRP), reference signal received quality (RSRQ), signal-to-interference-plus-noise ratio (SINR), etc.), a measurement of the NR signal strength (e.g., a downlink signal strength, RSSI, RSRP, RSRQ, SINR, etc.), a load at the LTE base station (e.g., number of connections, available bandwidth, delay, queue size, jitter, etc.), a load at the NR base station (e.g., number of connections, available bandwidth, delay, queue size, jitter, etc.), a device capability (e.g., whether the device is capable of communicating with the NR base station), and the like. In some examples, the type of session information 212 may substantially correspond to the session information 210, although specific values and/or measurements may vary.

As can be understood, the traffic steering component 120 can steer traffic associated with the UE 202 and the UE 204 based at least in part on one or more factors associated with the session information 210 and 212, respectively. For example, the session information 210 and 212 illustrate the UEs 202 and 204 that are similarly situated (e.g., include relatively the same session information) except for the differences in the flag (e.g., the policy information). That is, the UE 202 is prohibited from communicating through the NR base station 110 for a communication with a QCI of 6, while the UE 204 is associated with policy information that allows a communication to be steered through the NR base station 110. Of course, the UE 204 may communicate via the LTE base station 108 if the signal strength of the LTE base station 108 is above a threshold, if the traffic at the NR base station 110 is above a threshold, and/or if the signal strength of the NR base station is below a threshold. That is, the flag (e.g., policy information) in the session information 212 may not necessarily be dispositive regarding whether the UE 204 is communicating via the NR base station 110 or the LTE base station 108, and additional factors can be used to determine an optimal connection for the UE 204 out of available base stations.

Figure 3:
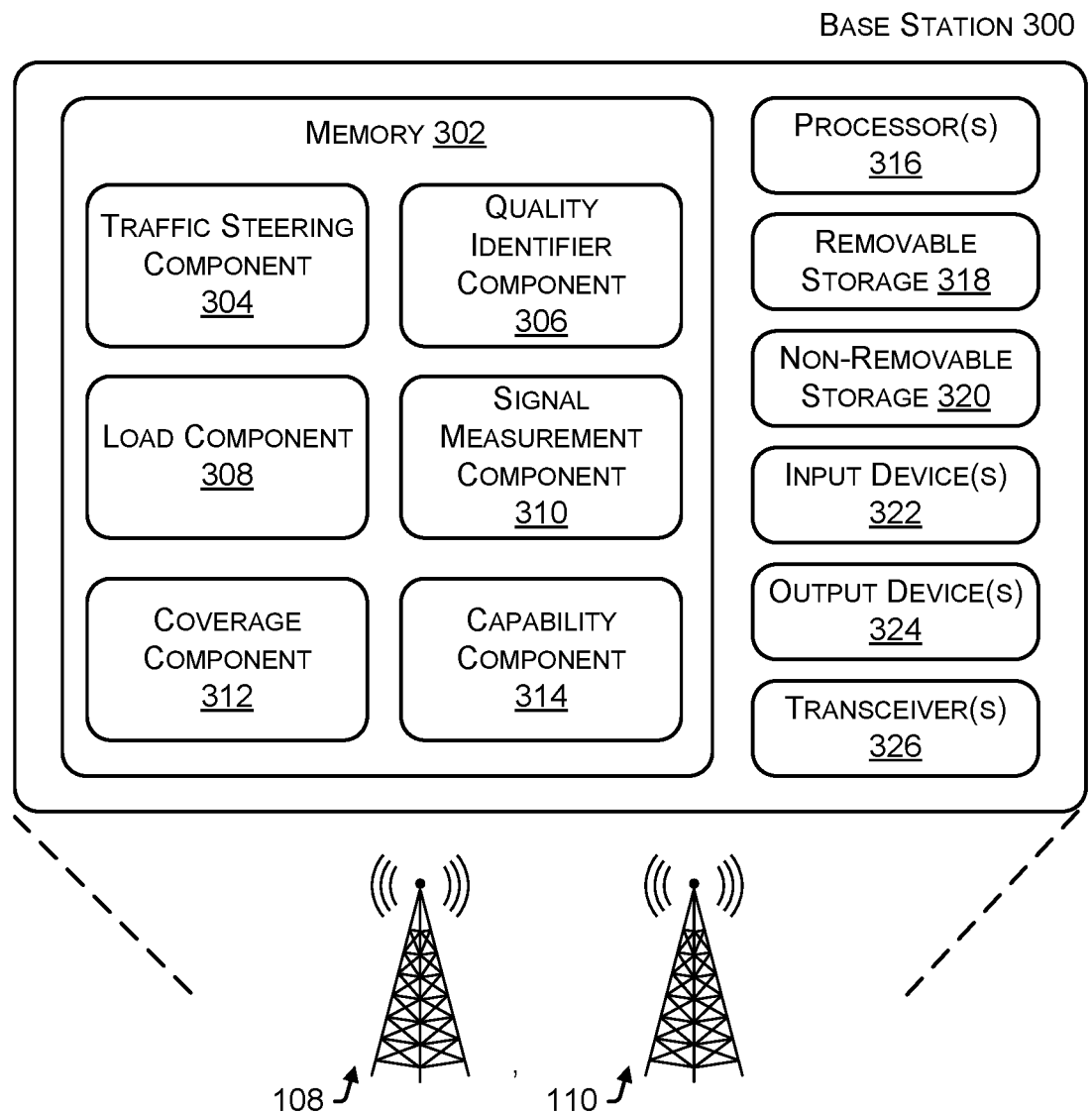
FIG. 3 illustrates an example base station to implement the dual connectivity traffic steering, as described herein.

FIG. 3 illustrates an example base station 300 to implement the dual connectivity traffic steering, as described herein. In some embodiments, the base station 300 can correspond to the base stations 108 or 110 of FIG. 1. It is to be understood in the context of this disclosure that the base station 300 can be implemented as a single device or as a plurality of devices with components and data distributed among them.

As illustrated, the base station 300 comprises a memory 302 storing a traffic steering component 304, a quality identifier component 306, a load component 308, a signal measurement component 310, a coverage component 312, and a capability component 314. Also, the base station 300 includes processor(s) 316, a removable storage 318 and non-removable storage 320, input device(s) 322, output device(s) 324, and transceiver(s) 326.

In various embodiments, the memory 302 is volatile (such as RAM), non-volatile (such as ROM, flash memory, etc.) or some combination of the two. The traffic steering component 304, the quality identifier component 306, the load component 308, the signal measurement component 310, the coverage component 312, and the capability component 314 stored in the memory 302 can comprise methods, threads, processes, applications or any other sort of executable instructions. The traffic steering component 304, the quality identifier component 306, the load component 308, the signal measurement component 310, the coverage component 312, and the capability component 314 can also include files and databases.

The traffic steering component 304 can include functionality to receive policy information and/or network status information (e.g., QCI, signal strength(s), load information, etc.) to steer traffic between base stations in a dual connectivity environment. For example, the traffic steering component 304 can determine whether to instruct a secondary base station (e.g., the NR base station 110) to initiate a communication with a UE based on the policy information, the QCI, and other network factors. In another example, the traffic steering component 304 can refrain from passing a communication to a secondary base station and can establish a communication between the UE and the master base station (e.g., the LTE base station 108). In some instances, the traffic steering component 304 can include the functionality of the traffic steering component 120 and/or can substantially correspond to the traffic steering component 120.

The quality identifier component 306 can include functionality to determine a quality identifier associated with a communication. In some instances, the quality identifier can represent a Quality of Service (QoS) Class Identifier (QCI), which may be assigned by a UE when requesting to initiate a conversation. For example, communications associated with an Internet browser may be assigned a first QCI by a UE, while communications associated with a voice call application may be assigned a second QCI by the UE. In such an example, the quality identifier component 306 can parse a request to initiate a communication to determine the QCI. In another example, the quality identifier component 306 can analyze a communication request and/or packets associated with a communication to assign a quality identifier (e.g., the quality identifier component 306 can assign a QCI to a communication based on attributes of the data to be transmitted or received). In some instances, the quality identifier component 306 can assign a QCI to a communication based on subscriber level, network traffic, available bandwidth, etc. In some instances, a quality identifier can be dynamically changed based on changing network conditions or topologies. In some instances, the quality identifier component 306 can send quality identifier information to the traffic steering component 304 to be factored in a determination about where to steer traffic.

The load component 308 can include functionality to determine a load at the base station 300. In some examples, the load component 308 can determine one or more of: a number of UEs connected to the base station 300; an amount of bandwidth of traffic handled by the base station 300 (e.g., relative to a total amount of bandwidth); a size of packet queues associated with the base station 300; a number of dropped packets of the base station 300; a delay associated with one or more communication of the base station 300; a number of channels used by one or more UEs; a packet jitter associated with the base station 300; and the like. In some instances, the load component 308 can determine a load associated with secondary base station associated with the (master) base station 300. In some instances, the load component 308 can include one or more threshold values that indicate, when a respective measured condition meets or exceeds, whether the base station is experiencing a congestion condition. In some instances, the load component 308 can send load information to the traffic steering component 304 to be factored in a determination about where to steer traffic.

The signal measurement component 310 can include functionality to determine characteristics of signals transmitted or received by the base station 300 (e.g., the master base station) or the secondary base station. In some instances, the characteristics of signals can correspond to a signal-to-noise ratio (SNR) and/or a signal-to-interference-plus-noise ratio (SINR) associated with one or more channels with the frequency resources allocated to the base station 300. In some instances, the signal measurement information can include individual signal information associated with one or more UEs in communication with the base station 300, and in some instances, the signal measurement information can represent aggregate signal measurements at the base station 300. In some instances, the signal measurement information can include, but is not limited to: a received signal strength indication (RSSI); reference signal received power (RSRP); reference signal received quality (RSRQ); and the like. In some instances, the signal measurement component 310 can send signal measurement information to the traffic steering component 304 to be factored in a determination about where to steer traffic.

The coverage component 312 can include functionality to determine coverage information associated with the base station 300. In some instances, the coverage information can be associated with a geographic region of the base station signals, which may vary by frequency resources. For example, a coverage area of the base station 300 using gigahertz waves may be smaller than a coverage area of the base station 300 using megahertz waves. In some instances, the coverage component 312 can include topological information to determine whether base stations (e.g., the LTE base station 108 and the NR base station 110) have overlapping regions of coverage. In some instances, the coverage component 312 can include location information associated with individual UEs in communication with the base station 300. For example, individual UEs can send location information (e.g., determined via GPS) to the base station 300, and in some instances, a location of a UE can be triangulated by capturing signals associated with a UE at various base stations. In some instances, the coverage component 312 can send coverage information to the traffic steering component 304 to be factored in a determination about where to steer traffic.

The capability component 314 can include functionality to receive capability information from one or more UEs in communication with the base station 300. For example, the capability information can include, but is not limited to: indications from one or more UEs that the UE can utilize a particular frequency resource (e.g., LTE or NR); indications that a UE can support dual connectivity; that a UE can support real time text (RTT), voice, video, data, etc.; and the like. In some instances, the capability component 314 can determine capability information by accessing a user profile, such as in connection with the HSS 116. In some instances, the capability component 314 can send capability information to the traffic steering component 304 to be factored in a determination about where to steer traffic. Of course, UEs lacking a capability to utilize the NR base station will not be assigned a bearer with the NR base station 110, for example.

In some embodiments, the processor(s) 316 is a central processing unit (CPU), a graphics processing unit (GPU), or both CPU and GPU, or other processing unit or component known in the art.

The base station 300 also includes additional data storage devices (removable and/or non-removable) such as, for example, magnetic disks, optical disks, or tape. Such additional storage is illustrated in FIG. 3 by removable storage 318 and non-removable storage 320. Tangible computer-readable media can include volatile and non-volatile, removable and non-removable media implemented in any method or technology for storage of information, such as computer readable instructions, data structures, program modules, or other data. The memory 302, the removable storage 318 and the non-removable storage 320 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the base station 300. Any such tangible computer-readable media can be part of the base station 300.

The base station 300 may be configured to communicate over a telecommunications network using any common wireless and/or wired network access technology. Moreover, the base station 300 may be configured to run any compatible device operating system (OS), including but not limited to, Microsoft Windows Mobile, Google Android, Apple iOS, Linux Mobile, as well as any other common mobile device OS.

The base station 300 also can include input device(s) 322, such as a keypad, a cursor control, a touch-sensitive display, voice input device, etc., and output device(s) 324 such as a display, speakers, printers, etc. These devices are well known in the art and need not be discussed at length here.

As illustrated in FIG. 3, the base station 300 also includes one or more wired or wireless transceiver(s) 326. For example, the transceiver(s) 326 can include a network interface card (NIC), a network adapter, a LAN adapter, or a physical, virtual, or logical address to connect to various networks, devices, or components illustrated in the network 100, for example. To increase throughput when exchanging wireless data, the transceiver(s) 326 can utilize multiple-input/multiple-output (MIMO) technology. The transceiver(s) 326 can comprise any sort of wireless transceivers capable of engaging in wireless, radio frequency (RF) communication. The transceiver(s) 326 can also include other wireless modems, such as a modem for engaging in Wi-Fi, WiMAX, Bluetooth, infrared communication, and the like.

Figure 4:
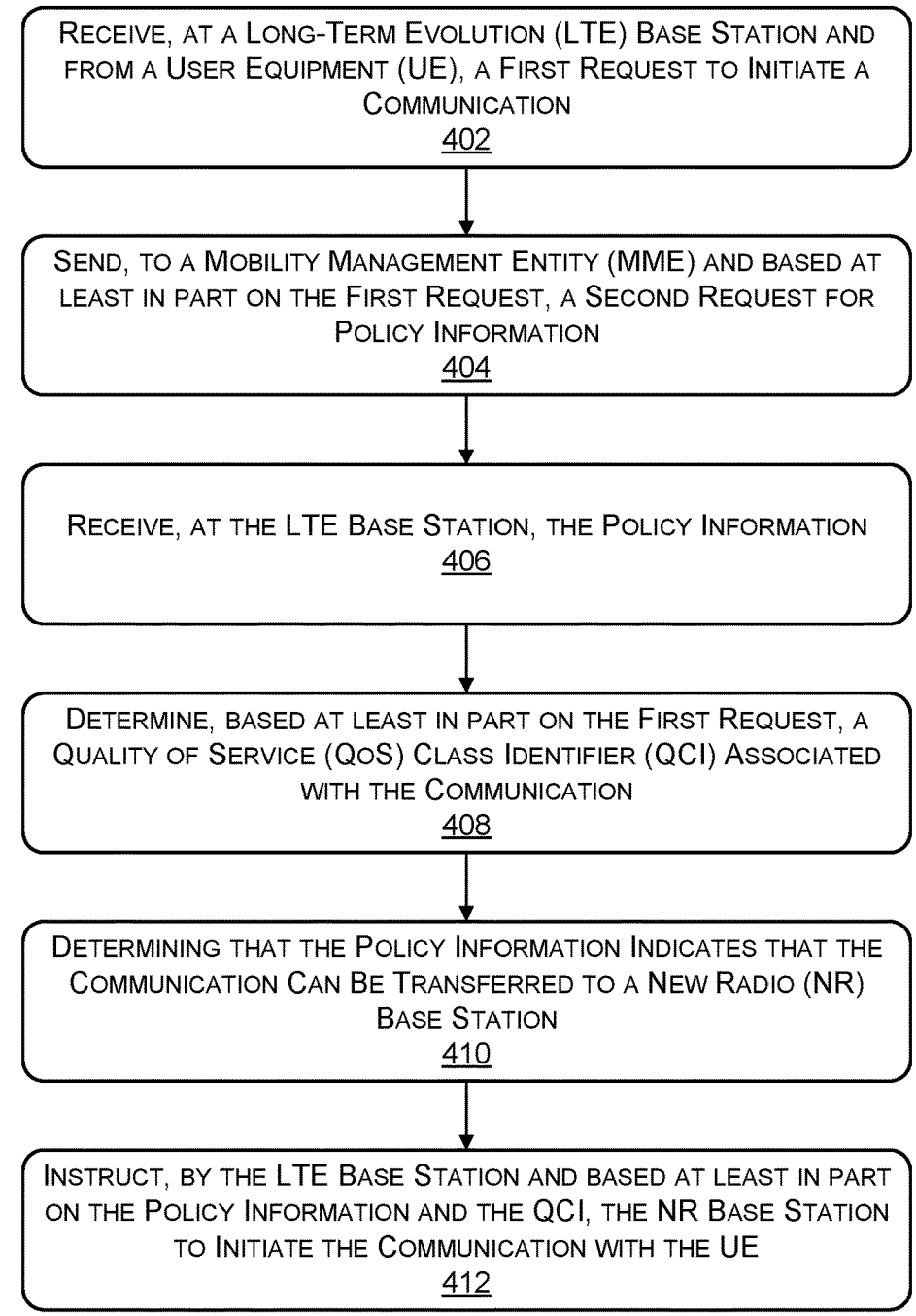
FIG. 4 illustrates an example process for instructing a New Radio (NR) base station to initiate a communication based on policy information and a quality identifier, as described herein.
Figure 5:
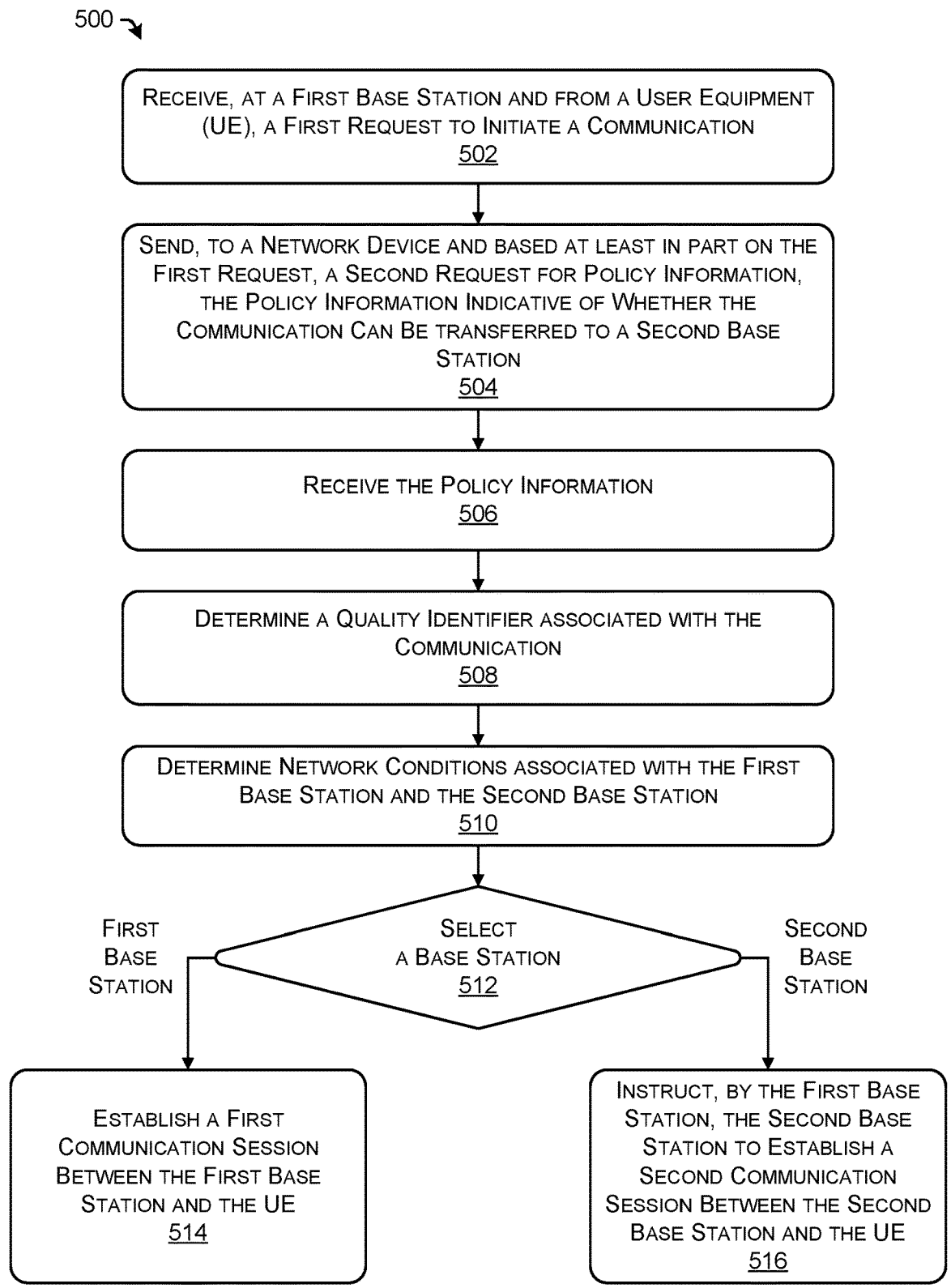
FIG. 5 illustrates an example process for selecting a base station in a dual connectivity environment, as described herein.

FIGS. 4 and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process 400 for instructing a New Radio (NR) base station to initiate a communication based on policy information and a quality identifier, as described herein. The example process 400 can be performed by the traffic steering component 120 or 304 (or another component), in connection with other components discussed herein. Some or all of the process 400 can be performed by one or more devices or components in the network 100, for example.

At operation 402, the process can include receiving, at a Long-Term Evolution (LTE) base station and from a user equipment (UE), a first request to initiate a communication. In some instances, the LTE base station may be an eNodeB base station operating in accordance with 4G technology. In some instances, the LTE base station can be a master base station relative to a secondary base station (e.g., a NR base station). In some instances, the first request may include a registration request and/or a request to establish a communication session. In some instances, the first request may include device capability information and/or an international mobile subscriber identity (IMSI).

At operation 404, the process can include sending, to a mobility management entity (MME) and based at least in part on the first request, a second request for policy information. In some instances, the second request can include the IMSI received in the operation 402. In some implementations (e.g., Option 3, 3a, 3x, etc.), the MME can be included in a 4G core network.

At operation 406, the process can include receiving, at the LTE base station, the policy information. In some instances, the policy information can include, but is not limited to, an indication, for each QCI level for a communication associated with a UE, whether the communication can be transferred to a NR base station operating in the dual connectivity environment. In some instances, the policy information can differentiate for an uplink portion and a downlink portion for each QCI level. For example, an uplink portion of a QCI 5 communication may be allowed to be transferred to a NR base station, while a downlink portion of a QCI 5 communication may not be allowed to be transferred to a NR base station. In some instances, the policy information can be received as a flag indicating whether a communication type can be transferred. Of course, these examples are illustrative and are not intended to be limiting.

At operation 408, the process can include determining, based at least in part on the first request, a Quality of Service (QoS) Class Identifier (QCI) associated with the communication. As discussed above, in some instances, the QCI may be expressly set/requested by the UE, while in some instances, the QCI can be determined based on traffic patterns and/or type. In some instances, the QCI can be assigned by the LTE base station.

At operation 410, the process can include determining that the policy information indicates that the communication can be transferred to the New Radio (NR) base station, as discussed herein. For example, the NR base station can be considered to be a secondary base station relative to the (master) LTE base station. In some instances, the operation 410 can include mapping the QCI of the communication to the policy information to determine whether the transfer can occur.

At operation 412, the process can include instructing, by the LTE base station and based at least in part on the policy information and the QCI, the NR base station to initiate the communication with the UE. In some instance, the operation 412 can include analyzing various signal characteristics (e.g., LTE signal strength and/or NR signal strength received at the UE), load information (e.g., LTE base station and/or NR base station load), etc. Thus, transferring the communication from the LTE base station to the NR base station can optimize performance for the particular communication, as well as the network as a whole, by utilizing dual connectivity in an intelligent manner.

FIG. 5 illustrates an example process 500 for selecting a base station in a dual connectivity environment, as described herein. The example process 500 can be performed by the traffic steering component 120 or 304 (or another component), in connection with other components discussed herein. Some or all of the process 500 can be performed by one or more devices or components in the network 100, for example.

At operation 502, the process can include receiving, at a first base station and from a user equipment (UE), a first request to initiate a communication. Depending on the implementation (e.g., Option 3, 3a, 3x, 4, 4a, 7, 7a, 7x), the first base station may be a LTE base station (e.g., an eNodeB) or the first base station may be an NR base station (e.g., a gNodeB). In some instances, the first base station may be a master base station relative to a secondary base station. In some instances, the first request may include a registration request and/or a request to establish a communication session. In some instances, the first request may include device capability information and/or an international mobile subscriber identity (IMSI).

At operation 504, the process can include sending, to a network device and based at least in part on the first request, a second request for policy information, the policy information indicative of whether the communication can be transferred to a second base station. In some instances, the network device can include a device in a 4G core network or a device in a 5G core network. In some instances, the second request can include the IMSI or other identifying information received in the operation 502.

At operation 506, the process can include receiving the policy information. As noted above, in some instances, the policy information can include, but is not limited to, an indication, for each QCI level of a communication associated with a UE, whether the communication can be transferred to a secondary base station operating in the dual connectivity environment. In some instances, the policy information can differentiate for an uplink portion and a downlink portion for each QCI level.

At operation 508, the process can include determining a quality identifier associated with the communication. In some instances, the quality identifier can be represented as a Quality of Service (QoS) Class Identifier (QCI), a QoS, a QoE, and the like. In some instances, the quality identifier can depend on a type of communication (e.g., data, voice, etc.), an application initiating the communication (e.g., an Internet browser, a SMS/MMS application, a video player application, a voice dialer, and the like). In some instances, the quality identifier can be set by the UE and determined by analyzing the communication request, and in some instances, the quality identifier can be set by the first base station. These examples are illustrative and are not intended to be limiting.

At operation 510, the process can include determining network conditions associated with the first base station and the second base station. For example, the operation 510 can include determining various signal characteristics (e.g., LTE signal strength and/or NR signal strength received at the UE), load information (e.g., LTE base station and/or NR base station load), historical usage patterns, etc.

At operation 512, the process can include selecting a base station for the communication. For example, the operation 512 can select a base station (e.g., the first base station or the second base station) based at least in part on the policy information, the quality identifier, and/or the network conditions associated with the first base station and the second base station. If the first base station is selected, the process continues to operation 514. If the second base station is selected, the process continues to operation 516.

At operation 514, the process can include establishing a first communication session between the first base station and the UE. For example, the first base station can assign a bearer to the UE to send and/or receive traffic to and from the UE.

At operation 516, the process can include instructing, by the first base station, the second base station to establish a second communication between the second base station and the UE. For example, the second base station can assign a bearer to the UE to send and/or receive traffic to and from the UE.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
a memory; and
one or more components stored in the memory and executable by the one or more processors to perform operations comprising:
receiving, at a first base station and from a user equipment (UE), a first request to initiate a communication;
sending, to a network device and based at least in part on the first request, a second request for policy information, wherein the policy information is indicative of whether the communication can be transferred to a second base station and is associated with a subscriber level of a user profile associated with the UE;
receiving, at the first base station, the policy information;
determining, based at least in part on the first request, a quality identifier associated with the communication;
determining that the policy information indicates that the communication can be initiated by the second base station; and
instructing, by the first base station and based at least in part on the policy information and the quality identifier, the second base station to initiate the communication with the UE.

2. The system of claim 1, wherein:
the first base station is eNodeB base station; and
the second base station is a gNodeB base station.

3. The system of claim 1, wherein the network device is a mobility management entity (MME).

4. The system of claim 1, wherein:
the quality identifier is a Quality of Service (QoS) Class Identifier (QCI); and
the QCI is indicative of a non-guaranteed bit rate (non-GBR) communication.

5. The system of claim 1, wherein a first geographic coverage area of the first base station at least partially corresponds to a second geographic coverage area of the second base station.

6. The system of claim 1, the operations further comprising:
determining a load level associated with the second base station;
determining that the load level is below a threshold load level; and
instructing the second base station to initiate the communication with the UE based at least in part on the load level being below the threshold load level.

7. The system of claim 1, wherein the first request includes at least one of device capability information or an international mobile subscriber identity (IMSI).

8. The system of claim 1, wherein:
the UE is a first UE,
the policy information is first policy information,
the communication is a first communication, and
the quality identifier is a first quality identifier,
the operations further comprising:
receiving, at the first base station and from a second UE, a third request to initiate a second communication;
sending, to the network device and based at least in part on the third request, a fourth request for second policy information, the second policy information indicative of whether the second communication can be transferred to the second base station;
receiving, at the first base station, the second policy information;
determining that the second policy information indicates that the second communication is not to be initiated by the second base station; and
establishing, based at least in part on the policy information, a communication session between the first base station and the second UE.

9. A processor-implemented method comprising:
receiving, at a first base station and from a user equipment (UE), a first request to initiate a communication, the first base station configured to communicate via a first communication type;
sending, to a network device and based at least in part on the first request, a second request for policy information, wherein the policy information is indicative of whether the communication can be transferred to a second base station configured to communicate via a second communication type and is associated with a subscriber level of a user profile associated with the UE;

receiving, at the first base station, the policy information;
determining, based at least in part on the first request, a quality identifier associated with the communication;
selecting, as a selected base station and based at least in part on the policy information and the quality identifier, the first base station or the second base station to communicate with the UE; and
initiating, by the selected base station, the communication with the UE.

10. The processor-implemented method of claim 9, wherein initiating the communication with the UE comprises:
establishing a first communication session between the first base station and the UE; or
instructing, by the first base station, the second base station to establish a second communication session between the second base station and the UE.

11. The processor-implemented method of claim 9, wherein:
the first base station is a Long-Term Evolution (LTE) base station; and
the second base station is a New Radio (NR) base station.

12. The processor-implemented method of claim 9, further comprising:
determining a first load associated with the first base station;
determining a second load associated with the second base station; and
selecting the selected base station based at least in part on the first load and the second load.

13. The processor-implemented method of claim 9, further comprising:
determining that the policy information indicates that the communication can be transferred to the second base station; and
selecting the selected base station based at least in part on the policy information and the quality identifier.

14. The system of claim 1, the operations further comprising:
determining signal data associated with at least one of a first wireless signal associated with the first base station and the UE or a second wireless signal associated with the second base station and the UE; and
instructing the second base station to initiate the communication with the UE further based at least in part on the signal data.

15. The system of claim 14, wherein the signal data comprises at least one of:
received signal strength indication (RSSI) data;
reference signal received power (RSRP) data;
reference signal received quality (RSRQ) data; or
signal-to-interference-plus-noise ratio (SINR) data.

16. The processor-implemented method of claim 9, wherein:
the quality identifier is a Quality of Service (QoS) Class Identifier (QCI); and
the QCI is indicative of a non-guaranteed bit rate (non-GBR) communication.

17. The processor-implemented method of claim 9, wherein the selecting is performed by the first base station.

18. The processor-implemented method of claim 9, wherein the first request includes at least one of device capability information or an international mobile subscriber identity (IMSI).

19. The processor-implemented method of claim 9, further comprising:
determining signal data associated with at least one of a first wireless signal associated with the first base station and the UE or a second wireless signal associated with the second base station and the UE; and
selecting the selected base station further based at least in part on the signal data.

20. The processor-implemented method of claim 19, wherein the signal data comprises at least one of:
received signal strength indication (RSSI) data;
reference signal received power (RSRP) data;
reference signal received quality (RSRQ) data; or
signal-to-interference-plus-noise ratio (SINR) data.

* * * * *